United States Patent
Miyagi

(10) Patent No.: US 12,223,724 B2
(45) Date of Patent: Feb. 11, 2025

(54) FRAUDULENT ACT RECOGNITION DEVICE, CONTROL PROGRAM THEREFOR, AND FRAUDULENT ACT RECOGNITION METHOD

(71) Applicant: Toshiba Tec Kabushiki Kaisha, Tokyo (JP)

(72) Inventor: Daisuke Miyagi, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 485 days.

(21) Appl. No.: 17/520,138

(22) Filed: Nov. 5, 2021

(65) Prior Publication Data

US 2022/0222472 A1    Jul. 14, 2022

(30) Foreign Application Priority Data

Jan. 14, 2021  (JP) ................................ 2021-004304

(51) Int. Cl.
*G06V 20/52* (2022.01)
*G06V 40/16* (2022.01)
*G06V 40/20* (2022.01)

(52) U.S. Cl.
CPC ............ *G06V 20/52* (2022.01); *G06V 40/172* (2022.01); *G06V 40/28* (2022.01)

(58) Field of Classification Search
CPC ....... G06V 20/52; G06V 40/172; G06V 40/28
See application file for complete search history.

(56) References Cited

U.S. PATENT DOCUMENTS

| 10,726,682 | B2 | 7/2020 | Takeno | |
|---|---|---|---|---|
| 2007/0057049 | A9* | 3/2007 | Kundu | G06V 20/52 235/383 |
| 2016/0210829 | A1* | 7/2016 | Uchida | G06T 7/20 |
| 2018/0114413 | A1* | 4/2018 | Tsuchimochi | G07G 1/0063 |
| 2018/0276456 | A1* | 9/2018 | Miyagi | G06V 20/52 |

FOREIGN PATENT DOCUMENTS

JP    2018-160140 A    10/2018

OTHER PUBLICATIONS

Notice of Reasons for Refusal dated Mar. 5, 2024 issued in JP Application No. 2021-004304, with English translation, 6 pages.

* cited by examiner

*Primary Examiner* — Jianxun Yang
(74) *Attorney, Agent, or Firm* — FOLEY & LARDNER LLP

(57) ABSTRACT

A fraudulent act recognition device is configured to be operatively coupled to a camera that monitors operation of a settlement terminal by a purchaser. The fraudulent act recognition device includes a controller configured to recognize a commodity registration operation of the settlement terminal initiated by the purchaser. The controller is configured to review imaging data provided by the camera to recognize an action of the purchaser who performs the commodity registration operation. The controller is configured to determine whether an action of the purchaser is indicative of a fraudulent act. The controller is configured to provide a notification in response to a determination that the action of the purchaser is indicative of the fraudulent act.

14 Claims, 10 Drawing Sheets

FIG. 3

| 71 | 72 | SC |
|---|---|---|
| REGISTER No.001 | BEING REGISTERED | |

73 — ERROR INFORMATION
[          ]

74 — DECLARATION INFORMATION
[ BAG IS UNNECESSARY ]

75 —

| COMMODITY NAME | NUMBER OF ARTICLES | AMOUNT |
|---|---|---|
| AAAAA | ONE | 100 YEN |
| BBBBB | ONE | 150 YEN |
| CCCCC | ONE | 250 YEN |

76 —
| TOTAL NUMBER OF ARTICLES | THREE |
| TOTAL AMOUNT | 500 YEN |
| DEPOSITED AMOUNT | |
| CHANGE | |

FIG. 5

| EC | MESSAGE |
|---|---|
| 91 | FRAUDULENT TAKE-OUT WAS PERFORMED IN REGISTER WITH REGISTER No. X |
| 92 | FALSE REGISTRATION WAS PERFORMED IN REGISTER WITH REGISTER No. X |
| 93 | COMMODITY WAS REPLACED IN REGISTER WITH REGISTER No. X |
| 94 | REGISTRATION OMISSION OCCURRED IN REGISTER WITH REGISTER No. X |
| 95 | REGISTER WITH REGISTER No. X DID NOT PERFORM SETTLEMENT YET |

| REGISTER No. | 001 |
|---|---|
| TIME TM | STorEC |
|  |  |
|  |  |
|  |  |
|  |  |
| ⋮ | ⋮ |

822

FRAUDULENT ACT RECOGNITION DEVICE, CONTROL PROGRAM THEREFOR, AND FRAUDULENT ACT RECOGNITION METHOD

CROSS-REFERENCE TO RELATED APPLICATION

This application is based upon and claims the benefit of priority from Japanese Patent Application No. 2021-004304, filed on Jan. 14, 2021, the entire contents of which are incorporated herein by reference.

FIELD

Embodiments described herein relate generally to a fraudulent act recognition device, a control program therefor, and a fraudulent act recognition method.

BACKGROUND

In recent years, in a retail store such as a supermarket, a self-service point of sale (POS) terminal has attracted attention from the viewpoint of a reduction in personal expenses, infection prevention measures against infectious diseases, and the like. A self-service POS terminal is a settlement terminal adapted for self-service with which a customer performs operation from registration to settlement of purchased commodities by himself or herself. In order to prevent fraudulent acts of customers, weight meters are used in many self-service POS terminals.

A weight meter is provided, for example, in a table for bagging a commodity for which registration is finished. The customer bags the commodity registered in the self-service POS terminal. The self-service POS terminal calculates a net weight of the bagged commodity according to a change in weight at that time. If the net weight does not coincide with a set weight of the registered commodity, the self-service POS terminal emits a warning. Therefore, since a warning is emitted, for example, if the customer commits a fraudulent act of bagging the commodity pretending as if the customer registers the commodity in the self-service POS terminal, there is a suppression effect for the fraudulent act of this type.

However, even if the weight meter is provided, a fraudulent act of replacing the registered commodity with another commodity having the same weight cannot be identified. Therefore, there is a demand for development of a technique that can suppress such a fraudulent act by the customer.

DESCRIPTION OF THE DRAWINGS

FIG. 3 is a schematic diagram illustrating an example of a monitoring image displayed on a display of an attendant terminal;

FIG. 5 is a schematic diagram illustrating an example of a message table;

FIG. 6 is a schematic diagram illustrating an example of a time-series buffer;

DETAILED DESCRIPTION

An object of embodiments is to provide, in order to solve the problems described above, a fraudulent act recognition device, a control program therefor, and a fraudulent act recognition method that can suppress a fraudulent act of replacing a registered commodity with another commodity.

In general, according to one embodiment, a fraudulent act recognition device is configured to be operatively coupled to a camera that monitors operation of a settlement terminal by a purchaser. The fraudulent act recognition device includes a controller configured to recognize a commodity registration operation of the settlement terminal initiated by the purchaser. The controller is configured to review imaging data provided by the camera to recognize an action of the purchaser who performs the commodity registration operation. The controller is configured to determine whether the action of the purchaser is indicative of a fraudulent act. The controller is configured to provide a notification in response to an determination that the action of the purchaser is indicative of the fraudulent act.

Figure 1:
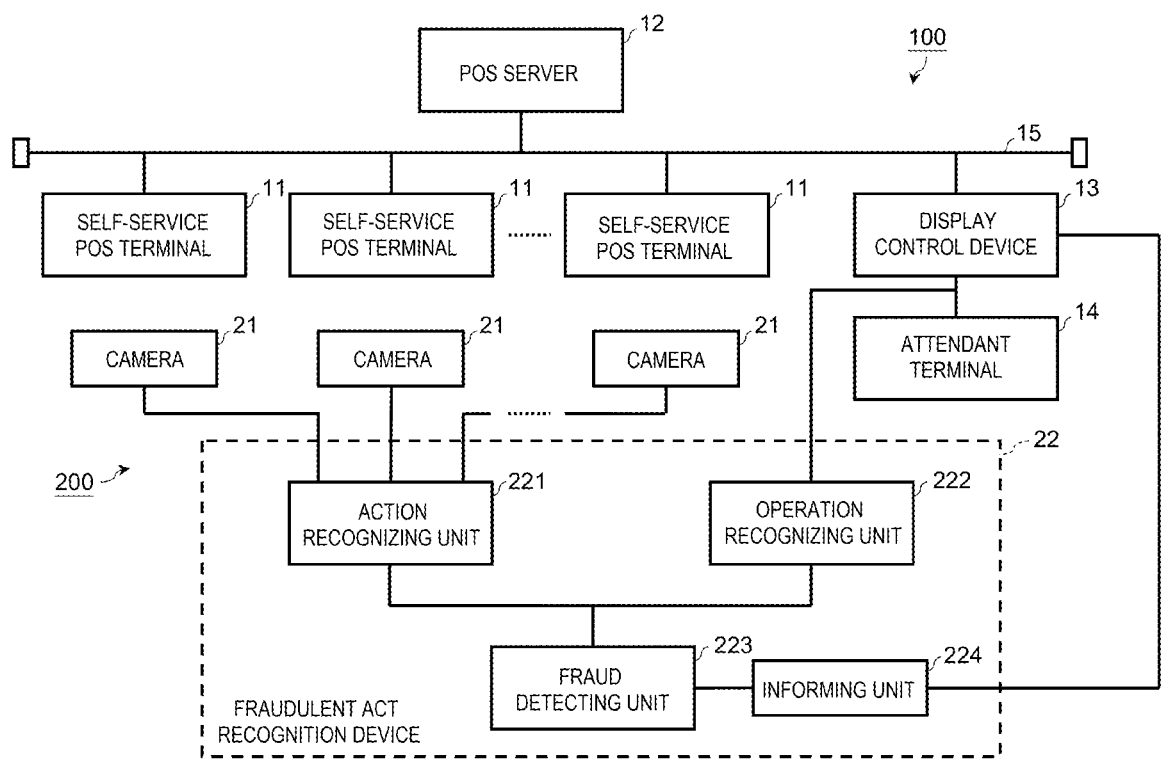
FIG. 1 is a block diagram of a system configuration a store where a self-service POS terminal is introduced.

An embodiment is explained below with reference to the drawings. FIG. 1 is a system configuration diagram of a store where a self-service POS terminal 11 is introduced. This system (e.g., a store system, a checkout system, etc.) includes a self-service POS system 100 and a fraudulent act recognition system 200. The self-service POS system 100 includes a plurality of self-service POS terminals 11, a POS server 12, a display control device 13, an attendant terminal 14, and a communication network 15. The plurality of self-service POS terminals 11, the POS server 12, and the display control device 13 are connected to the communication network 15. The attendant terminal 14 is connected to the display control device 13. The communication network 15 is typically a local area network (LAN). The LAN may be a wired LAN or may be a wireless LAN.

The self-service POS terminal 11 (e.g., a user interface) is a settlement terminal adapted for self-service with which a customer performs operation from registration to settlement of purchased commodities by himself or herself. The customer is sometimes referred to as purchaser, consumer, client, and the like. The POS server 12 is a server computer for centrally controlling the operations of the self-service POS terminals 11. The display control device 13 is a controller that generates, based on data signals output from the self-service POS terminals 11, a monitoring image SC (see FIG. 3) for each of the self-service POS terminals 11 and causes a display device of the attendant terminal 14 to display the monitoring image SC. The attendant terminal 14 is a terminal for a store clerk (e.g., an attendant) to monitor states of the self-service POS terminals 11. The attendant terminal 14 includes a display (e.g., a user interface) such as a liquid crystal display or an organic EL display. The attendant terminal 14 divides a screen of the display into a plurality of screens and displays the monitoring image SC (e.g., a notification, a message, a visual indicator) associated with a different attendant terminal 14 for each of the divided screens. A well-known self-service POS system in the past can be directly applied to such a self-service POS system 100.

The fraudulent act recognition system 200 includes a plurality of cameras 21 and a fraudulent act recognition device 22. The plurality of cameras 21 respectively correspond to the plurality of self-service POS terminals 11 in a one to one relation. The cameras 21 are cameras for photographing customers who operate the self-service POS terminals 11 corresponding to the cameras 21.

The fraudulent act recognition device 22 includes functions of an action recognizing unit 221, an operation recognizing unit 222, a fraud detecting unit 223, and an informing unit 224 (e.g., includes processing circuitry or control circuitry, such as at least one controller, that performs the functions of the action recognizing unit 221, the operation recognizing unit 222, the fraud detecting unit 223, and the informing unit 224). The action recognizing unit 221 performs a function of recognizing, based on imaging data (e.g., video data) output from the cameras 21, an action of a customer who performs commodity registration operation in the self-service POS terminal 11. The commodity registration operation is clarified in the following explanation. The action recognizing unit 221 can be referred to as action recognizing means as well. The operation recognizing unit 222 performs a function of recognizing, based on data of the monitoring image SC output from the display control device 13 to the attendant terminal 14, the commodity registration operation in the self-service POS terminal 11 by the customer. The operation recognizing unit 222 can be referred to as operation recognizing means as well. The fraud detecting unit 223 performs a function of detecting, based on a recognition result by the action recognizing unit 221 and a recognition result by the operation recognizing unit 222, a fraudulent act of the customer from an action of the customer to a commodity for which the commodity registration operation is recognized. The fraud detecting unit 223 can be referred to as fraud detecting means as well. The informing unit 224 performs a function of informing the fraudulent act of the customer if the fraudulent act is detected by the fraud detecting unit 223. The informing is performed, for example, from the attendant terminal 14 to the attendant. The informing unit 224 can be referred to as informing means as well.

Figure 2:
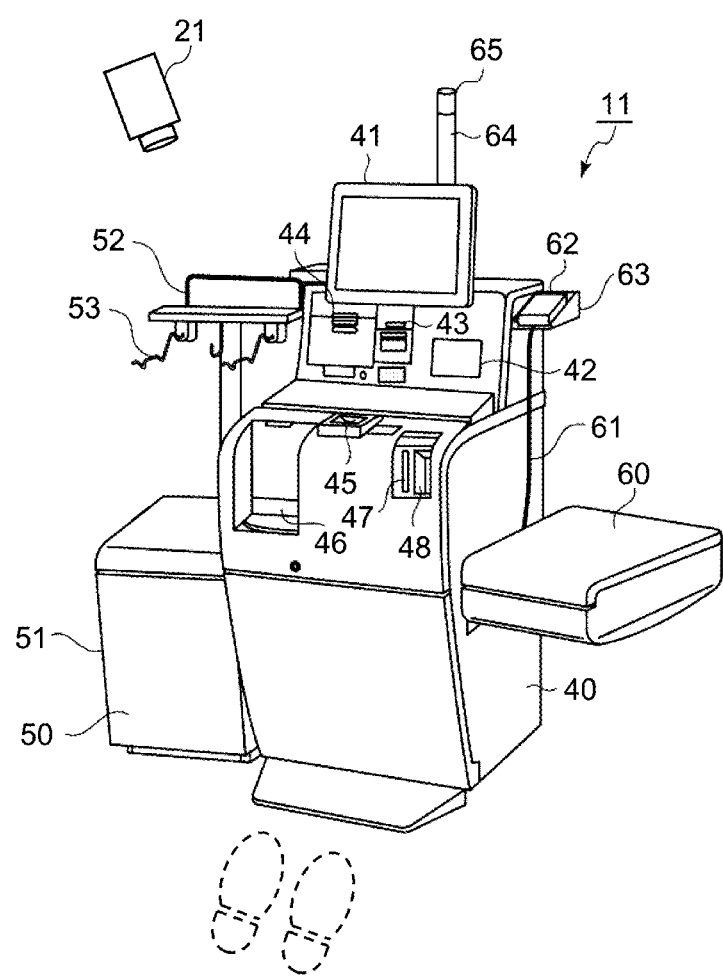
FIG. 2 is a perspective view illustrating a positional relation between the self-service POS terminal and a camera.

FIG. 2 is a diagram for explaining a positional relation between the self-service POS terminal 11 and the camera 21. First, an exterior configuration of the self-service POS terminal 11 is explained.

The self-service POS terminal 11 includes a main body 40 set on a floor surface and a bagging table 50 set besides the main body 40. A touch panel 41 (e.g., a user interface) is attached to an upper part of the main body 40. The touch panel 41 is configured by a display and a touch sensor. The display is a device for displaying various screens to an operator who operates the self-service POS terminal 11. The touch sensor is a device for detecting a touch input to a screen by the operator. In the self-service POS terminal 11, the operator is usually a customer.

In the main body 40, a basket table 60 is provided in a side surface center portion on the opposite side of a side where the bagging table 50 is set. The basket table 60 is a table for a customer coming from a selling floor to place, for example, a basket storing purchased commodities. The customer stands on the near side of the main body 40 in FIG. 2 where the customer is able to see a screen of the touch panel 41.

Therefore, when viewed from the customer, the basket table 60 is present on the right side across the main body 40 and the bagging table 50 is present on the left side across the main body 40. In the following explanation, the side where the customer stands is represented as the front of the main body 40, the side where the bagging table 50 is set is represented as the left side of the main body 40, and the side where the basket table 60 is provided is represented as the right side of the main body 40.

In the front of the main body 40, a reading window 42 of a scanner, a card insertion port 43, a receipt dispensing port 44, a coin depositing port 45, a coin dispensing port 46, a bill depositing port 47, and a bill dispensing port 48 are formed. A communication cable 61 extends from the right side surface of the main body 40 to the outside. A reader/writer 62 for electronic money media is connected to the distal end of the communication cable 61. The reader/writer 62 is placed on a placing table 63 provided in a right side surface upper part of the main body 40.

A display pole 64 is attached to the upper surface of the main body 40. The display pole 64 includes, at the distal end portion thereof, a light emitting unit 65 (e.g., a light, a visual indicator, etc.) that selectively emits, for example, blue and red light. The display pole 64 displays (e.g., indicates) the current state of the self-service POS terminal 11, for example, a standby state, an operating state, a calling state, and an error state, each corresponding to certain light emission colors of the light emitting unit 65.

The bagging table 50 has a structure in which a bag holding tool 52 is attached to an upper part of a housing 51. The bag holding tool 52 includes a pair of holding arms 53. The holding arms 53 hold a register bag prepared in a store or a shopping bag, a so-called "my bag" carried by a customer, or the like.

A positional relation between the self-service POS terminal 11 and the camera 21 is explained. As illustrated in FIG. 2, the camera 21 is set in a position where the camera 21 is capable of photographing, from above, a customer who stands in the front of the self-service POS terminal 11 and faces components such as the main body 40, the bagging table 50, and the basket table 60.

First, the customer standing in the front of the self-service POS terminal 11 places a basket or the like storing purchased commodities on the basket table 60 on the right side and causes the holding arms 53 on the left side to hold a register bag, a "may bag," (e.g., a bag brought into the store by the customer) or the like. Subsequently, the customer operates the touch panel 41 according to guidance displayed on the touch panel 41 and declares a use start of the self-service POS terminal 11.

Thereafter, the customer picks up the purchased commodities from the bag placed on the basket table 60 one by one. If a barcode is attached to the purchased commodity, the customer performs commodity registration by holding the barcode over the reading window 42 and causing the scanner to read the barcode. If a barcode is not attached to the purchased commodity, the customer performs the commodity registration by operating the touch panel 41 to select the purchased commodity from a list of commodities without barcodes. The customer puts the purchased commodity, for which registration is finished, in the register bag, the "my bag," or the like.

The customer finishes registering all of the purchased commodities and subsequently operates the touch panel 41 to select a settlement method. For example, if selecting cash settlement, the customer deposits bills or coins in the bill depositing port 47 or the coin depositing port 45 and takes out change dispensed from the bill dispensing port 48 or the coin dispensing port 46. For example, if selecting electronic money settlement, the customer holds an electronic money medium over the reader/writer 62. For example, if selecting credit card settlement, the customer inserts a credit card into the card insertion port 43. If ending the settlement in this way, the customer receives a receipt dispensed from the receipt dispensing port 44, carries the register bag or the "my bag" removed from the holding arms 53, and leaves the store.

That is, the camera 21 is set in a position where the camera 21 is capable of photographing a movement of a hand of the customer who acts as explained above in the front of the self-service POS terminal 11.

FIG. 3 is a schematic diagram illustrating an example of the monitoring image SC displayed on the display of the attendant terminal 14. As explained above, the monitoring images SC respectively corresponding to the plurality of self-service POS terminals 11 are divided and displayed on the display of the attendant terminal 14. FIG. 3 is an example of the monitoring image SC corresponding to one self-service POS terminal 11 among the plurality of self-service POS terminals 11. The configuration of the monitoring images SC corresponding to the other self-service POS terminals 11 is the same as the monitoring image SC illustrated in FIG. 3. Therefore, explanation of the configuration is omitted.

As illustrated in FIG. 3, the monitoring image SC includes a register number field 71, a terminal state field 72, an error information field 73, a declaration information field 74, a details field 75, and a total field 76.

The register number field 71 is a field for displaying a register number. Register numbers are unique serial numbers allocated to the self-service POS terminals 11 that individually identify the self-service POS terminals 11. The register numbers are identification information for identifying the self-service POS terminals 11.

The terminal state field 72 is a field for displaying an operation state of the self-service POS terminal 11. In this embodiment, any one of "standby," "use start," "being registered," "settlement start," and "being settled" is displayed in the terminal state field 72 as the operation state.

The "standby" is a state from when the preceding customer ends settlement until when a use start of the next customer is declared. An initial image is displayed on the touch panel 41 of the self-service POS terminal 11 in the state of "standby." The initial image is an image including a touch button for causing the customer to select, for example, whether to use a register bag prepared in the store or use a "my bag."

The "use start" is a state in which the customer standing in the front of the self-service POS terminal 11 declares a use start for settlement. The customer performs, on the initial image, selection operation for selecting whether to use the register bag or the "my bag." The selection operation is declaration of the use start. In response to the selection operation, the operation state of the self-service POS terminal 11 changes to the "use start."

The "being registered" is a state in which registration operation for a purchased commodity by the customer himself or herself is received. If a first purchased commodity is registered, the operation state of the self-service POS terminal 11 changes to "being registered." Thereafter, the operation state of the self-service POS terminal 11 maintains the "being registered" until a shift to settlement is declared.

The "settlement start" is a state in which the customer finishing the registration of the purchased commodity declares a shift to settlement. A soft key of [checkout] is displayed on the touch panel 41 of the self-service POS terminal 11 in the state of "being registered." The customer finishing the registration of the purchased commodity touches the soft key of [checkout]. This operation is declaration of the shift to the settlement. In response to the operation, the operation state of the self-service POS terminal 11 changes to the "settlement start."

The "being settled" is a state in which settlement processing such as cash settlement, electronic money settlement, or credit card settlement is executed. For example, if bills or coins are deposited in the bill depositing port 47 or the coin depositing port 45, the operation state of the self-service POS terminal 11 changes to the "being settled." If the settlement processing is ended, the operation state of the self-service POS terminal 11 returns to the "standby."

The error information field 73 is a field for displaying information concerning an error that occurs in the self-service POS terminal 11. The error information is a communication error, a receipt run-out error, or the like. The declaration information field 74 is a field for displaying declaration operation content of the customer. For example, if the customer selects the "my bag," the text string "bag is unnecessary" is displayed, indicating that the register bag is unnecessary.

The details field 75 is a field for displaying details information of a purchased commodity registered in the self-service POS terminal 11. The details information is, for example, a commodity name, the number of articles, and an amount of the purchased commodity. The total field 76 is a field for displaying total information of the purchased commodity registered in the self-service POS terminal 11. The total information is a total number of articles, a total amount, a deposited amount, change, and the like.

The configuration of the monitoring image SC is not limited to this. Fields in which other items are displayed may be arranged. Items of text data displayed in FIG. 3 are not limited to this. Text data of other items may be displayed.

Figure 4:
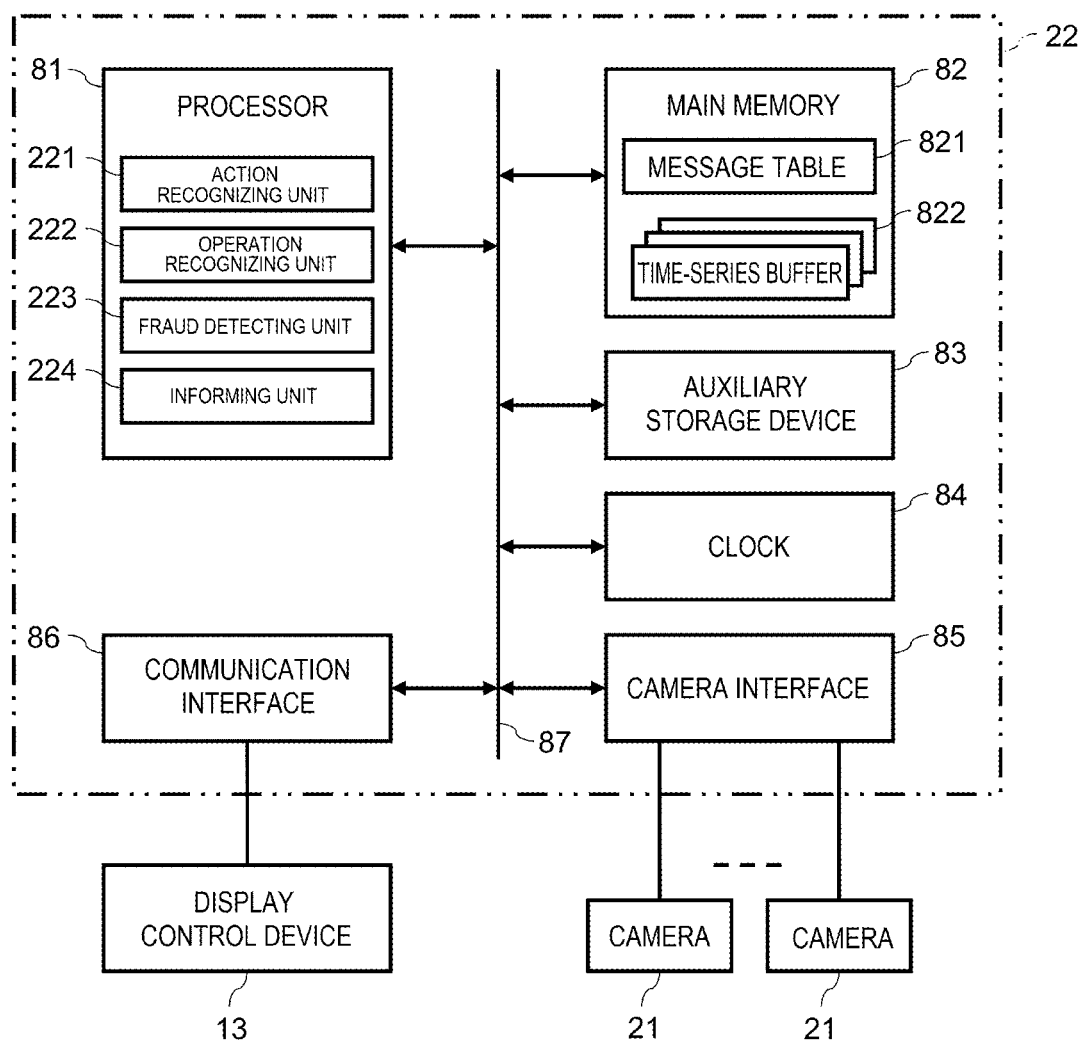
FIG. 4 is a block diagram illustrating a main part circuit configuration of a fraudulent act recognition device.

FIG. 4 is a block diagram illustrating a main part circuit configuration of the fraudulent act recognition device 22. The fraudulent act recognition device 22 includes a processor 81, a main memory 82, an auxiliary storage device 83, a clock 84, a camera interface 85, a communication interface 86, and a system bus 87. The system bus 87 includes an address bus and a data bus. In the fraudulent act recognition device 22, a computer (e.g., a controller) is configured by connecting the processor 81, the main memory 82, the auxiliary storage device 83, the clock 84, the camera interface 85, and the communication interface 86 with the system bus 87.

The processor 81 is equivalent to a central part of the computer. The processor 81 controls the units according to an operating system or application programs in order to realize various functions of the fraudulent act recognition device 22. The processor 81 is, for example, a central processing unit (CPU).

The main memory 82 is equivalent to a main storage part of the computer. The main memory 82 includes a nonvolatile memory region and a volatile memory region. The main memory 82 stores the operating system and the application programs in the nonvolatile memory region. The main memory 82 stores, in the volatile memory region, data necessary for the processor 81 to execute processing for controlling the units. The data of this type is sometimes stored in the nonvolatile memory region. The main memory 82 uses the volatile memory region as a work area in which data is rewritten as appropriate by the processor 81. The nonvolatile memory region is, for example, a read-only memory (ROM). The volatile memory region is, for example, a random-access memory (RAM).

The auxiliary storage device 83 is equivalent to an auxiliary storage part of the computer. As the auxiliary storage device 83, a well-known storage device such as a solid state drive (SSD), a hard disc drive (HDD), or an electric erasable programmable read-only memory (EEPROM) (registered trademark) is used alone or a plurality of the well-known devices are used in combination. The auxiliary storage device 83 stores data used by the processor 81 in performing various kinds of processing, data generated by the processing in the processor 81, and the like. The auxiliary storage device 83 sometimes stores application programs.

The application programs stored in the main memory 82 or the auxiliary storage device 83 include a control program explained below. A method of installing the control program in the main memory 82 or the auxiliary storage device 83 is not particularly limited. The control program can be installed in the main memory 82 or the auxiliary storage device 83 by recording the control program in a removable recording medium or distributing the control program by communication via a network. A form of the recording medium may be any form if the recording medium can store programs and can be read by a device like a CD-ROM, a memory card, or the like.

The clock 84 functions as a time information source of the fraudulent act recognition device 22. The processor 81 acquires present date and time based on time information tracked by the clock 84.

The camera interface 85 is an interface for communicating with the cameras 21. Imaging data output from the cameras 21 are captured into the fraudulent act recognition device 22 via the camera interface 85. The imaging data are data obtained by photographing customers who operate the self-service POS terminals 11 corresponding to the cameras 21.

The communication interface 86 is an interface for communicating with the display control device 13. Image data output from the display control device 13 is captured into the fraudulent act recognition device 22 via the communication interface 86. The image data is data of the monitoring image SC generated for each of the self-service POS terminals 11.

The fraudulent act recognition device 22 having such a configuration uses a part of the volatile memory region in the main memory 82 as a region of a message table 821. The fraudulent act recognition device 22 forms, in this region, the message table 821 having a data structure illustrated in FIG. 5.

FIG. 5 is a schematic diagram illustrating an example of the message table 821. As illustrated in FIG. 5, the message table 821 is a data table in which text data of a message is described in correlation with an error code EC. The error code EC and the text data of the message correlated with the error code EC are clarified in explanation below.

The fraudulent act recognition device 22 uses a part of the volatile memory region in the main memory 82 as a region of a time-series buffer 822. In the fraudulent act recognition device 22, time series buffers 822 having a data structure illustrated in FIG. 6 are formed in this region as many as the number of the self-service POS terminals 11.

FIG. 6 is a schematic diagram illustrating an example of the time-series buffer 822. As illustrated in FIG. 6, the time-series buffer 822 includes a region for describing a status ST and the error code EC in ascending order of time TM for each of register numbers for identifying the self-service POS terminals 11. The status ST is also clarified in the explanation below.

In order to suppress a fraudulent act of a customer to the self-service POS terminal 11, the fraudulent act recognition device 22 realizes, with the processor 81 and a control program for controlling the processor 81, functions of the action recognizing unit 221, the operation recognizing unit 222, the fraud detecting unit 223, and the informing unit 224.

The functions of the action recognizing unit 221, the operation recognizing unit 222, the fraud detecting unit 223, and the informing unit 224 are functions included in each of the self-service POS terminals 11. Therefore, in the following explanation, the functions of the action recognizing unit 221, the operation recognizing unit 222, the fraud detecting unit 223, and the informing unit 224 corresponding to the one self-service POS terminal 11 are explained in detail. The functions of the action recognizing unit 221, the operation recognizing unit 222, the fraud detecting unit 223, and the informing unit 224 corresponding to the other self-service POS terminals 11 are the same. Therefore, explanation of the functions is omitted.

Figure 7:
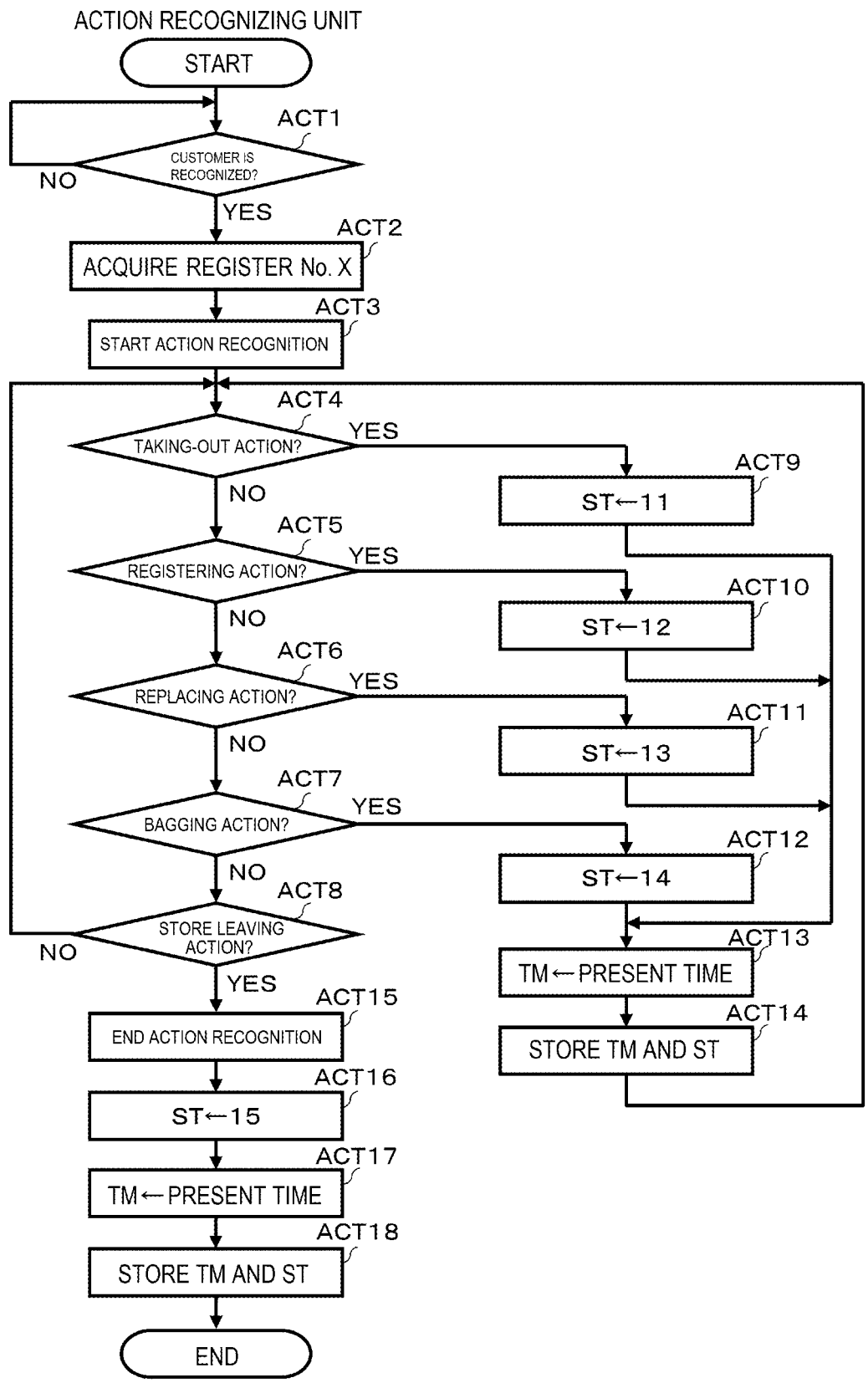
FIG. 7 is a flowchart for explaining a function of an action recognizing unit.

FIG. 7 is a flowchart for explaining the function of the action recognizing unit 221. In ACT 1, the processor 81 waits for a customer to be recognized. The camera 21 is set in a position where the camera 21 is capable of photographing, from above, a customer standing in the front of the self-service POS terminal 11. Therefore, if detecting from video data of the camera 21 that a person stands in the front of the self-service POS terminal 11, the processor 81 determines that the processor 81 recognizes a customer.

If recognizing a customer, the processor 81 determines YES in ACT 1 and proceeds to ACT 2. In ACT 2, the processor 81 acquires a register number of the self-service POS terminal 11. The cameras 21 correspond to the self-service POS terminals 11 in a one to one relation. Therefore, the processor 81 specifies the self-service POS terminal 11 from identification information of the camera 21 photographing the customer standing in the front of the self-service POS terminal 11 and acquires a register number of the self-service POS terminal 11.

In ACT 3, the processor 81 starts action recognition for the customer. Specifically, the processor 81 estimates a skeleton of the person, that is, the customer from an image photographed by the camera 21. The skeleton estimation can be realized even by an inexpensive camera 21 by using an AI technology such as deep learning. The processor 81 recognizes a taking-out action, a registering action, a replacement action, a bagging action, or a store leaving action of the customer from a movement of a hand obtained by the skeleton estimation.

The taking-out action is an action of taking out a purchased commodity from a basket or other shopping container (e.g., a cart, a bag, etc.) placed on or nearby the basket table 60. For example, if detecting a movement of a skeleton of one hand or both hands moving to the right side of the main body 40 (e.g., toward the basket) and lifting a purchased commodity, the processor 81 recognizes that the taking-out action is performed.

The registering action is an action of registering, in the self-service POS terminal 11, data of the purchased commodity taken out from the basket. For example, if detecting a movement of the skeleton of the hand, which performs the taking-out action, holding the purchased commodity over the reading window 42 in the center of the main body 40, the processor 81 recognizes that the registering action is performed. Alternatively, if detecting a movement of the skeleton of the one hand operating the touch panel 41 of the main body 40, the processor 81 recognizes that the registering action is performed.

The replacing action is an action of moving the hand holding the purchased commodity, for which the registration is finished, in the floor direction or the back direction of the customer. By moving the hand holding the purchased commodity in the floor direction or the back direction of the customer, the customer can replace the registered commodity with another commodity having the same weight. For example, if detecting a movement of the skeleton of the hand, which performs the replacing action, taking out another commodity from a bag or the like placed at the customer's feet or behind the customer, replacing the purchased commodity, for which the registration is finished, with the other commodity, and directly putting the other commodity in a register bag or a "my bag," the processor 81 recognizes that the replacing action is performed.

The bagging action is an action of putting the purchased commodity, for which the registration is finished, in the register bag, the "my bag," or the like on the bagging table 50. For example, if detecting a movement of the skeleton of the hand, which performs the registering action, moving to the left side of the main body and putting the purchased commodity in the register bag, the "my bag," or the like, the processor 81 recognizes that the bagging action is performed.

The store leaving action is an action of the customer, who ends settlement, separating from (e.g., moving away from) the self-service POS terminal 11. For example, after the skeleton of the hand of the customer, who ends the settlement, performs a movement of removing the register bag, the "my bag," or the like from the holding arms 53, if the customer cannot be detected from the video data of the camera 21, the processor 81 recognizes that the store leaving action is performed.

In ACT 4 to ACT 8, the processor 81 waits for the processor 81 to recognize the taking-out action, the registering action, the replacing action, the bagging action, or the store leaving action.

If recognizing the taking-out action in this waiting state, the processor 81 determines YES in ACT 4 and proceeds to ACT 9. In ACT 9, the processor 81 sets the status ST to "11." If recognizing the registering action, the processor 81 determines YES in ACT 5 and proceeds to ACT 10. In ACT 10, the processor 81 sets the status ST to "12." If recognizing the replacing action, the processor 81 determines YES in ACT 6 and proceeds to ACT 11. In ACT 11, the processor 81 sets the status ST to "13." If recognizing the bagging action, the processor 81 determines YES in ACT 7 and proceeds to ACT 12. In ACT 12, the processor 81 sets the status ST to "14."

If ending the processing in ACT 9, ACT 10, ACT 11, or ACT 12, the processor 81 proceeds to ACT 13. In ACT 13, the processor 81 acquires present time TM tracked by the clock 84. In ACT 14, the processor 81 describes the time TM and the status ST in correlation with each other in the time-series buffer 822 in which the register number acquired in the processing in ACT 2 is set. Thereafter, the processor 81 returns to the waiting state in ACT 4 to ACT 8.

If the taking-out action for the self-service POS terminal 11 is recognized by the function of the action recognizing unit 221 in this way, "11" is described as the status ST together with the time TM in the time-series buffer 822 in which the register number of the self-service POS terminal 11 is set. Similarly, if the registering action is recognized, "12" is described as the status ST together with the time TM in the time-series buffer 822. If the replacing action is recognized, "13" is described as the status ST together with the time TM in the time-series buffer 822. If the bagging action is recognized, "14" is described as the status ST together with the time TM in the time-series buffer 822.

Usually, the customer repeats, in order, the taking-out action, the registering action, and the bagging action for the self-service POS terminal 11 to register data of the purchased commodity in the self-service POS terminal 11. Therefore, the status ST is stored in time series in the order of "11," "12," and "14" in the time-series buffer 822. If the replacing action is performed, the taking-out action, the registering action, the replacing action, and the bagging action is performed on the self-service POS terminal 11 in this order. Therefore, the status ST is stored in time series in the order of "11," "12," "13," and "14" in the time-series buffer 822.

If recognizing the store leaving action in the waiting state in ACT 4 to ACT 8, the processor 81 determines YES in ACT 8 and proceeds to ACT 15. In ACT 15, the processor 81 ends the action recognition for the customer.

In ACT 16, the processor 81 ending the action recognition sets the status ST to "15." In ACT 17, the processor 81 acquires the present time TM tracked by the clock 84. In ACT 18, the processor 81 describes the time TM and the status ST in correlation with each other in the time-series buffer 822 in which the register number acquired in the processing in ACT 2 is set. Therefore, "15" is stored as the status ST together with the time TM in the time-series buffer 822 corresponding to the self-service POS terminal 11 from which the customer separates.

Then, the processor 81 ends the function of the action recognizing unit 221. Thereafter, if detecting again from the video data of the camera 21 that a person stands in the front of the self-service POS terminal 11, the processor 81 executes the processing in ACT 2 to ACT 18 in the same manner as explained above.

Figure 8:
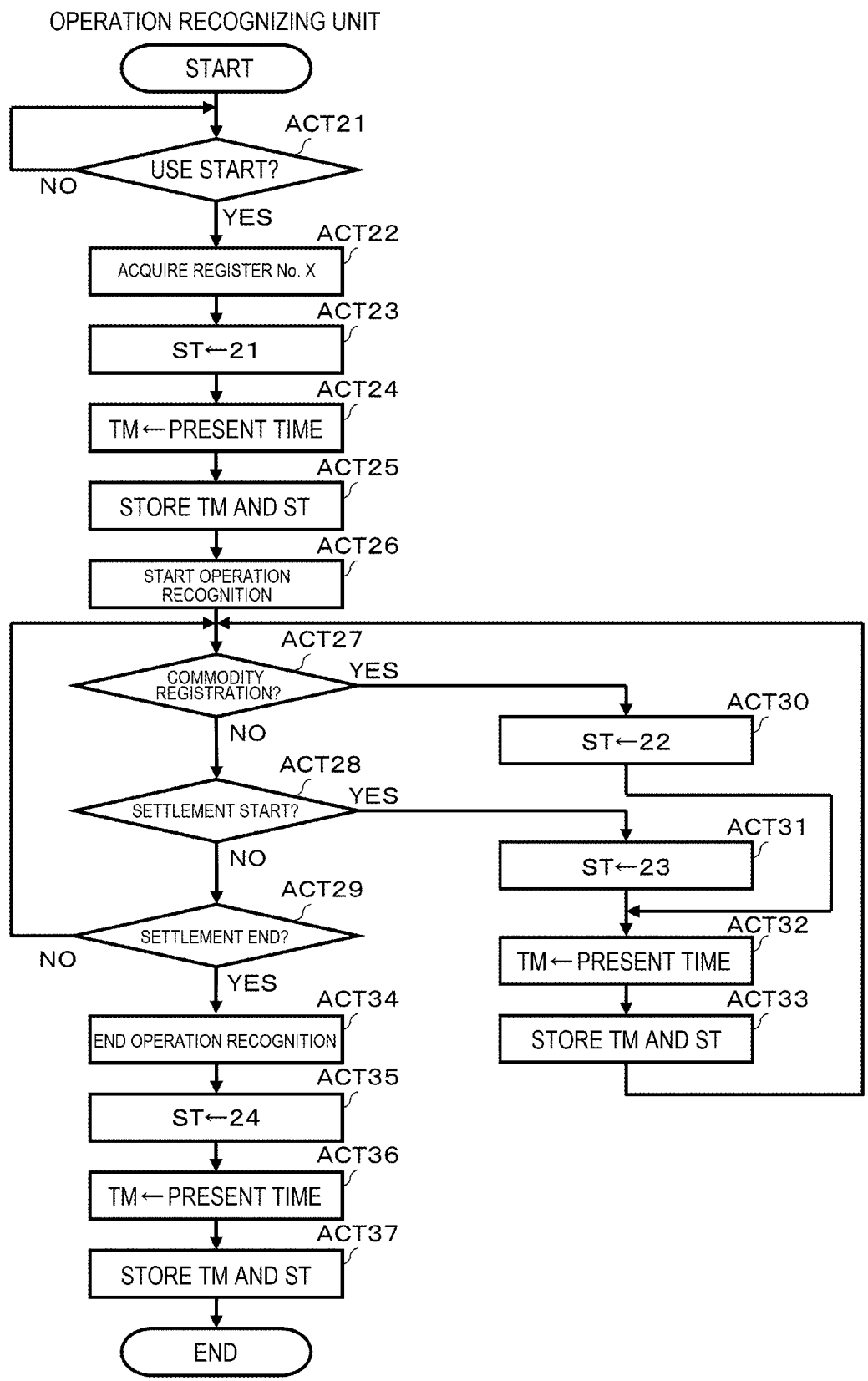
FIG. 8 is a flowchart for explaining a function of an operation recognizing unit.

FIG. 8 is a flowchart for explaining the function of the operation recognizing unit 222. In ACT 21, the processor 81 waits for a use start is declared for the self-service POS terminal 11. If a use start is declared, the "use start" is displayed in the terminal state field 72 of the monitoring image SC corresponding to the self-service POS terminal 11. The processor 81 confirms whether characters of "use start" can be recognized from the terminal state field 72 of the monitoring image SC acquired via the display control device 13. If the characters of "use start" can be recognized, the processor 81 recognizes that the use start is declared.

If recognizing that the use start is declared, the processor 81 determines YES in ACT 21 and proceeds to ACT 22. In ACT 22, the processor 81 acquires a register number of the self-service POS terminal 11. The register number is displayed in the register number field 71 of the monitoring image SC. The processor 81 recognizes characters of the register number from the register number field 71 of the monitoring image SC acquired via the display control device 13 and acquires the characters as the register number.

In ACT 23, the processor 81 sets the status ST to "21." In ACT 24, the processor 81 acquires the present time TM tracked by the clock 84. In ACT 25, the processor 81 describes the time TM and the status ST in correlation with each other in the time-series buffer 822 in which the register number acquired in the processing in ACT 22 is set.

Therefore, if the customer standing in the front of the self-service POS terminal 11 performs declaration operation for the use start, first, "21" is stored as the status ST together with the time TM in the time-series buffer 822 corresponding to the self-service POS terminal 11.

In ACT 26, the processor 81 starts operation recognition for the self-service POS terminal 11. Specifically, the processor 81 recognizes commodity registration operation, settlement start operation, or settlement end operation from transition of information acquired by character recognition of the monitoring image SC acquired via the display control device 13.

For example, if details (e.g., information) such as a commodity name, the number of articles, and an amount of a purchased commodity is added to the details field 75, the processor 81 recognizes that commodity registration operation is performed. For example, if the display of the terminal state field 72 is switched to the "settlement start," the processor 81 recognizes that settlement start operation is performed. For example, if the display of the terminal state field 72 is switched to the "standby," the processor 81 recognizes that the settlement end operation is performed.

In ACT 27 to ACT 29, the processor 81 waits for the processor 81 to recognize the commodity registration operation, the settlement start operation, or the settlement end operation. If recognizing the commodity registration operation, the processor 81 determines YES in ACT 27 and proceeds to ACT 30. In ACT 30, the processor 81 sets the status ST to "22." If recognizing the settlement start operation, the processor 81 determines YES in ACT 28 and proceeds to ACT 31. In ACT 31, the processor 81 sets the status ST to "23."

If ending the processing in ACT 30 or ACT 31, the processor 81 proceeds to ACT 32. In ACT 32, the processor 81 acquires the present time TM tracked by the clock 84. In ACT 33, the processor 81 describes the time TM and the status ST in correlation with each other in the time-series buffer 822 in which the register number acquired in the processing in ACT 22 is set. Thereafter, the processor 81 returns to the waiting state in ACT 27 to ACT 29.

If the commodity registration operation for the self-service POS terminal 11 is recognized by the function of the operation recognizing unit 222 in this way, "22" is described as the status ST together with the time TM in the time-series buffer 822 in which a register number of the self-service POS terminal 11 is set. Similarly, if the settlement start operation is recognized, "23" is described as the status ST together with the time TM in the time-series buffer 822.

Usually, the commodity registration operation is performed on the self-service POS terminal 11 by the registering action of the customer. Therefore, in the time-series buffer 822, after the status ST indicating the registering action, that is, "12," the status ST indicating the commodity registration operation, that is, "22" is stored.

The customer ending the bagging action of all purchased commodities declares a settlement start. Therefore, in the time-series buffer 822, after the status ST indicating the bagging action, that is, "14," the status ST indicating the settlement start operation, that is, "23" is stored.

If recognizing the settlement end operation in the waiting state in ACT 27 to ACT 29, the processor 81 determines YES in ACT 29 and proceeds to ACT 34. In ACT 34, the processor 81 ends the operation recognition with respect to the self-service POS terminal 11.

In ACT 35, the processor 81 ending the operation recognition sets the status ST to "24." In ACT 36, the processor 81 acquires the present time TM tracked by the clock 84. In ACT 37, the processor 81 describes the time TM and the "status ST=24" in correlation with each other in the time-series buffer 822 in which the register number acquired in the processing in ACT 22 is set. Therefore, "24" is stored as the status ST together with the time TM in the time-series buffer 822 corresponding to the self-service POS terminal 11 for which the settlement is ended.

Then, the processor 81 ends the function of the operation recognizing unit 222. Thereafter, if detecting the use start operation for the self-service POS terminal 11 from the data of the monitoring image SC again, the processor 81 executes the processing in ACT 22 to ACT 37 in the same manner as explained above.

Figure 9:
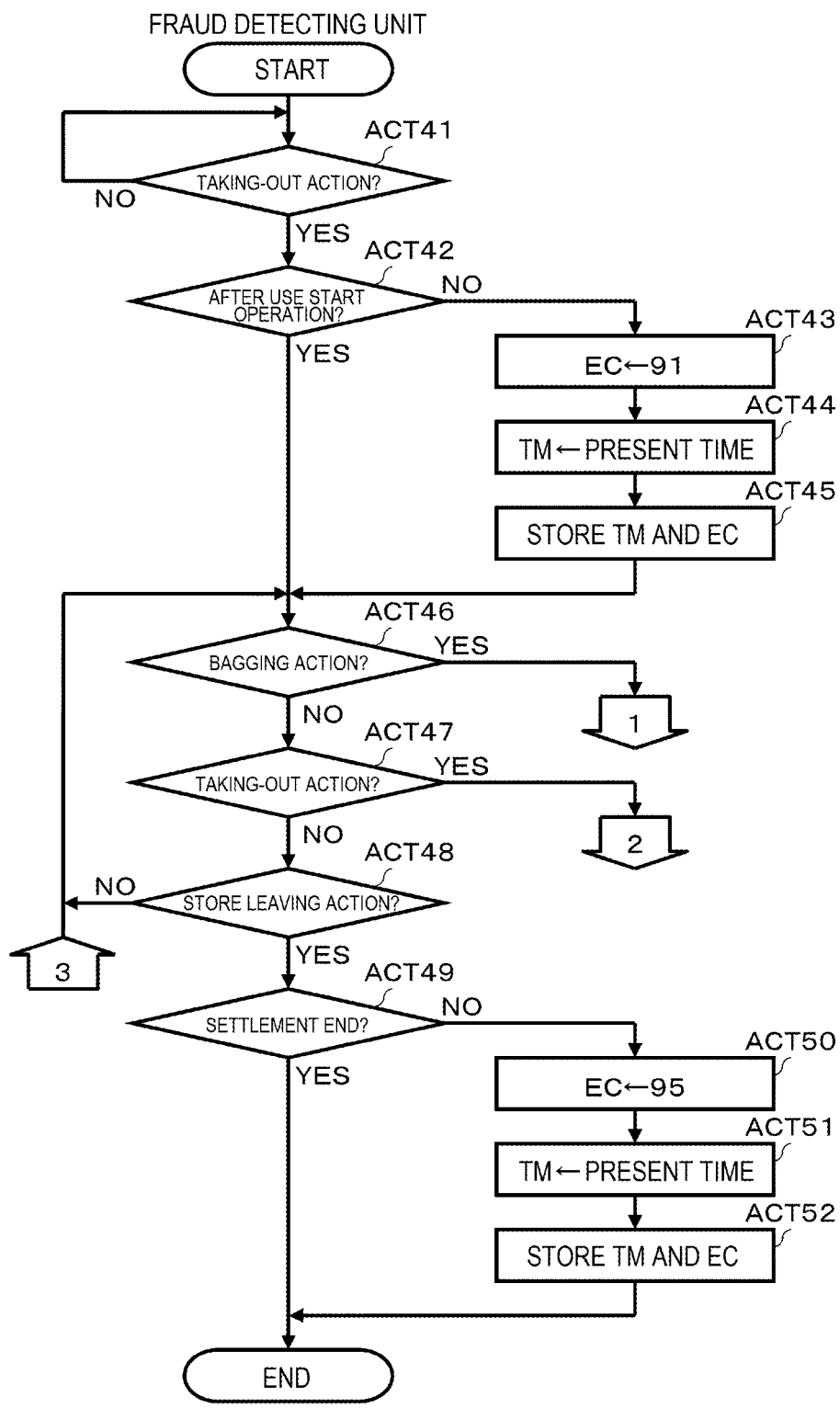
FIG. 9 is a flowchart for explaining a function of a fraud detecting unit.
Figure 10:
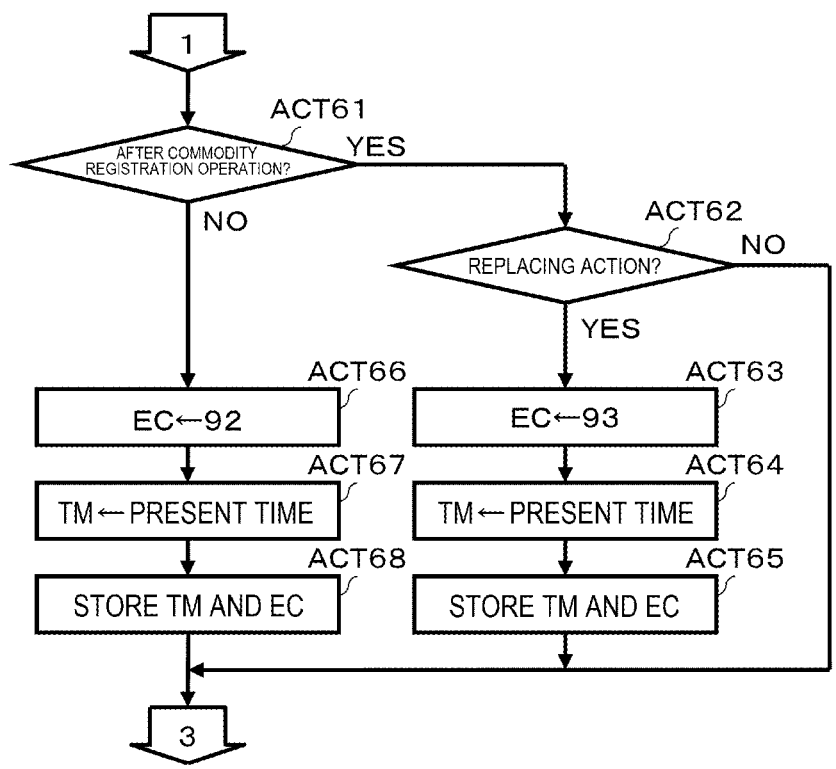
FIG. 10 is a flowchart for explaining the function of the fraud detecting unit.
Figure 11:
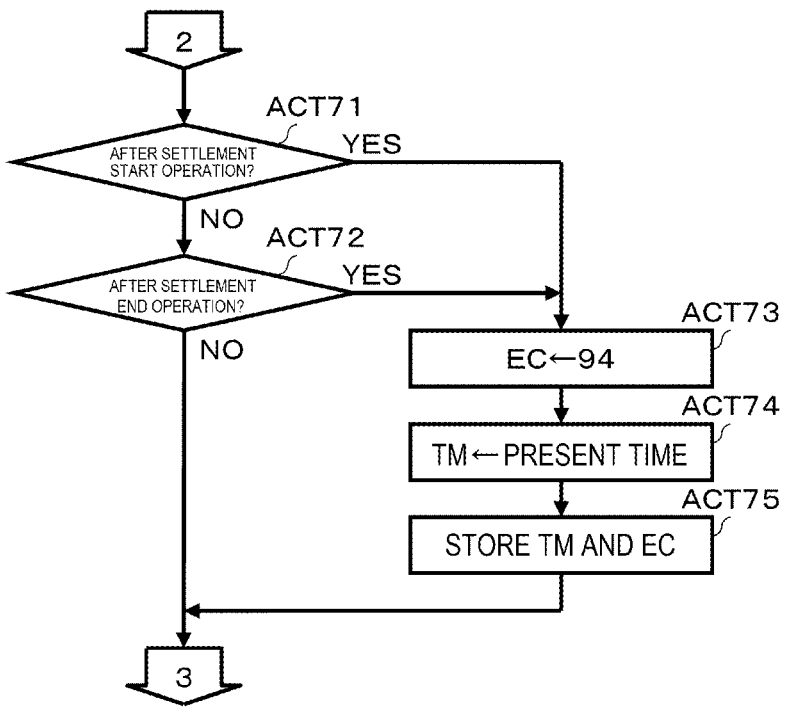
FIG. 11 is a flowchart for explaining the function of the frau detecting unit.

FIGS. 9 to 11 are flowcharts for explaining the function of the fraud detecting unit 223. In ACT 41, the processor 81 waits for the taking-out action to be recognized by the action recognizing unit 221. As explained above, "11" is described as the status ST in the time-series buffer 822 in which a register number of the self-service POS terminal 11, in which the taking-out action is recognized, is set. If detecting that "11" is described as the status ST in the time-series buffer 822, the processor 81 determines YES in ACT 41 and proceeds to ACT 42.

In ACT 42, the processor 81 confirms whether the taking-out action is performed after the use start operation (e.g., while the self-service POS terminal 11 is in the standby state). If the use start operation is performed on the self-service POS terminal 11, "21" is described as the status ST in the time-series buffer 822. Therefore, the processor 81 searches through the time-series buffer 822 in a direction going back from the time TM when "11" is described as the status ST. If detecting that "21" is described as the status ST, the processor 81 determines that the taking-out action is performed after the use start operation. In contrast, if detecting "15" or "24" as the status ST or ending the search through the time-series buffer 822, the processor 81 determines that the taking-out action is not performed after the use start operation.

If the taking-out action is not performed after the use start operation, the processor 81 determines NO in ACT 42 and proceeds to ACT 43. In ACT 43, the processor 81 sets the error code EC to "91." In ACT 44, the processor 81 acquires the present time TM tracked by the clock 84. In ACT 45, the processor 81 describes the time TM and the error code EC in correlation with each other in the time-series buffer 822. Thereafter, the processor 81 proceeds to ACT 46.

On the other hand, if the taking-out action is performed after the use start operation, the processor 81 determines YES in ACT 42. The processor 81 skips the processing in ACT 43 to ACT 45 and proceeds to ACT 46.

Therefore, if the taking-out action of a commodity is recognized in the self-service POS terminal 11 in which the declaration operation for the use start is not performed, "91" is stored as the error code EC in the time-series buffer 822 in which a register number of the self-service POS terminal 11 is set.

If the use start operation is not recognized but the taking-out action is recognized in this way, "91" is stored as the error code EC in the time-series buffer 822. That is, "91" of the error code EC is a code for identifying, as a fraudulent act "fraudulent take-out," an act of the customer who performs the taking-out action without performing the declaration operation for the use start.

In ACT 46, the processor 81 confirms whether the bagging action is recognized by the action recognizing unit 221. As explained above, if the bagging action is recognized, "14" is described as the status ST in the time-series buffer 822. If "14" is not described as the status ST in the time-series buffer 822, the processor 81 determines NO in ACT 46 and proceeds to ACT 47.

In ACT 47, the processor 81 confirms whether the taking-out action is recognized by the action recognizing unit 221. As explained above, if the taking-out action is recognized, "11" is described as the status ST in the time-series buffer 822. If "11" is not described as the status ST in the time-series buffer 822, the processor 81 determines NO in ACT 47 and proceeds to ACT 48.

In ACT 48, the processor 81 confirms whether the store leaving action is recognized by the action recognizing unit 221. As explained above, if the store leaving action is recognized, "15" is described as the status ST in the time-series buffer 822. If "15" is not described as the status ST in the time-series buffer 822, the processor 81 determines NO in ACT 48 and returns to ACT 46.

In ACT 46 to ACT 48, the processor 81 waits for the customer, who performs the taking-out action of a first commodity, to thereafter perform the bagging action, perform the taking-out action of another commodity, or perform the store leaving action.

If "14" is described as the status ST in the time-series buffer 822 in this waiting state, the processor 81 determines YES in ACT 46 and proceeds to ACT 61 in FIG. 10.

In ACT 61, the processor 81 confirms whether the bagging action is performed after the commodity registration operation. As explained above, if the commodity registration operation is recognized in the operation recognizing unit 222, "22" is described as the status ST in the time-series buffer 822. Therefore, if "22" is described as the status ST in correlation with the time TM immediately preceding the time TM when "14" is described as the status ST, the processor 81 recognizes that the bagging action is performed after the commodity registration operation. The processor 81 determines YES in ACT 61 and proceeds to ACT 62.

In ACT 62, the processor 81 confirms whether the replacing action is recognized by the action recognizing unit 221. As explained above, if the replacing action is recognized, "13" is described as the status ST in the time-series buffer 822. If "13" is not described as the status ST in the time-series buffer 822, the processor 81 determines NO in ACT 48 and returns to ACT 46 in FIG. 9. That is, the processor 81 returns to the waiting state in ACT 46 to ACT 48.

If "13" is described as the status ST in the time-series buffer 822, the processor 81 determines YES in ACT 62 and proceeds to ACT 63. In ACT 63, the processor 81 sets the error code EC to "93." In ACT 64, the processor 81 acquires the present time TM tracked by clock 84. In ACT 65, the processor 81 describes the time TM and the error code EC in correlation with each other in the time-series buffer 822 in which "13" is described as the status ST. Thereafter, the processor 81 returns to ACT 46 in FIG. 9. That is, the processor 81 returns to the waiting state in ACT 46 to ACT 48.

In this way, if the replacing action is recognized after the commodity registration operation is recognized, "93" is stored as the error code EC in the time-series buffer 822. That is, "93" of the error code EC is a code for identifying, as a fraudulent act "replacement," an action of a customer who performs the replacing action of a commodity for which the commodity registration operation is performed.

In contrast, if "22" is not described as the status ST in correlation with the time TM immediately preceding the time TM when "15" is described as the status ST, the processor 81 recognizes that the bagging action is not performed after the commodity registration operation. The processor 81 determines NO in ACT 61 and proceeds to ACT 66.

In ACT 66, the processor 81 sets the error code EC to "92." In ACT 67, the processor 81 acquires the present time TM tracked by the clock 84. In ACT 68, the processor 81 describes the time TM and the error code EC in correlation with each other in the time-series buffer 822 in which "14" is described as the status ST. Thereafter, the processor 81 returns to ACT 46 in FIG. 9. That is, the processor 81 returns to the waiting state in ACT 46 to ACT 48.

In this way, if the commodity registration operation is not recognized but the bagging action is recognized, "92" is stored as the error code EC in the time-series buffer 822. That is, "92" of the error code EC is a code for identifying, as a fraudulent act "false registration," an act of a customer who performs the bagging action of a commodity for which the commodity registration operation is not performed.

Referring back to FIG. 9, if "11" is described as the status ST in the time-series buffer 822 and the taking-out action is recognized in the waiting state in ACT 46 to ACT 48, the processor 81 proceeds to ACT 71 in FIG. 11. In ACT 71, the processor 81 confirms whether the taking-out action is performed after the settlement start operation. As explained above, if the settlement start operation is recognized in the operation recognizing unit 222, "23" is described as the status ST in the time-series buffer 822. Therefore, if "23" is described as the status ST in correlation with the time TM immediately preceding the time TM when "11" is described as the status ST, the processor 81 recognizes that the taking-out action is performed after the settlement start operation. In other words, if "23" is not described as the status ST in correlation with the time TM immediately preceding the time TM when "11" is described as the status ST, the processor 81 recognizes that the taking-out action is not performed after the settlement start operation.

If the taking-out action is not performed after the settlement start operation, the processor 81 determines NO in ACT 71 and proceeds to ACT 72. In ACT 72, the processor 81 confirms whether the taking-out action is performed after the settlement end operation. As explained above, if the settlement end operation is recognized in the operation recognizing unit 222, "24" is described as the status ST in the time-series buffer 822. Therefore, if "24" is described as the status ST in correlation with the time TM immediately preceding the time TM when "11" is described as the status ST, the processor 81 recognizes that the taking-out action is performed after the settlement end operation. In other words, if "24" is not described as the status ST in correlation with the time TM immediately preceding the time TM when "11" is described as the status ST, the processor 81 recognizes that the taking-out action is not performed after the settlement end operation.

If the taking-out action is not performed after the settlement end operation, the processor 81 determines NO in ACT 72 and returns to ACT 46 in FIG. 9. That is, the processor 81 returns to the waiting state in ACT 46 to ACT 48.

On the other hand, if the taking-out action is performed after the settlement start operation or after the settlement end operation, the processor 81 determines YES in ACT 71 or ACT 72 and proceeds to ACT 73. In ACT 73, the processor 81 sets the error code EC to "94." In ACT 74, the processor 81 acquires the present time TM tracked by the clock 84. In ACT 75, the processor 81 describes the time TM and the error code EC in correlation with each other in the time-series buffer 822 in which "11" is described as the status ST. Thereafter, the processor 81 returns to ACT 46 in FIG. 9. That is, the processor 81 returns to the waiting state in ACT 46 to ACT 48.

In this way, if the commodity taking-out action is recognized after the settlement start operation or the settlement end operation is recognized (e.g., after the customer has caused the self-service POS terminal 11 to initiate a settlement operation), "94" is stored as the error code EC in the time-series buffer 822. That is, "94" of the error code EC is a code for identifying, as a fraudulent act "registration omission," an act of a customer taking out an unregistered commodity from a basket after the settlement start operation or the settlement end operation.

Referring back to FIG. 9, if "15" is described as the status ST in the time-series buffer 822 and the store leaving action is recognized in the waiting state in ACT 46 to ACT 48, the processor 81 determines YES in ACT 48 and proceeds to ACT 49. In ACT 49, the processor 81 confirms whether the store leaving action is performed after the settlement end operation. As explained above, if the settlement end operation is recognized in the operation recognizing unit 222 (e.g., the self-service POS terminal 11 has completed the settlement operation), "25" is described as the status ST in the time series buffer 822. Therefore, if "24" is described as the status ST in correlation with the time TM immediately preceding the time TM when "15" is described as the status ST, the processor 81 recognizes that the store leaving action is performed after the settlement end operation. In other words, if "24" is not described as the status ST in correlation with the time TM immediately preceding the time TM when "15" is described as the status ST, the processor 81 recognizes that the store leaving action is not performed after the settlement end operation.

If the store leaving action is performed after the settlement end operation, the processor 81 determines YES in ACT 49. The processor 81 ends the function of the fraud detecting unit 223.

In contrast, if the store leaving action is not performed after the settlement end operation, the processor 81 determines NO in ACT 49 and proceeds to ACT 50. In ACT 50, the processor 81 sets the error code EC to "95." In ACT 51, the processor 81 acquires the present time TM tracked by the clock 84. In ACT 52, the processor 81 describes the time TM and the error code EC in correlation with each other in the time-series buffer 822 in which "15" is described as the status ST.

If the settlement end operation is not recognized but the store leaving action is recognized, "95" is stored as the error code EC in the time-series buffer 822. That is, "95" of the error code EC is a code for identifying, as a fraudulent act "unsettled," an act of a customer who performs the store leaving action before the settlement end operation.

Then, the processor 81 ends the function of the fraud detecting unit 223. Thereafter, if the taking-out action is recognized again, the processor 81 executes the processing in ACT 42 to ACT 52, ACT 61 to ACT 68, and ACT 71 to ACT 75 in the same manner as explained above.

Figure 12:
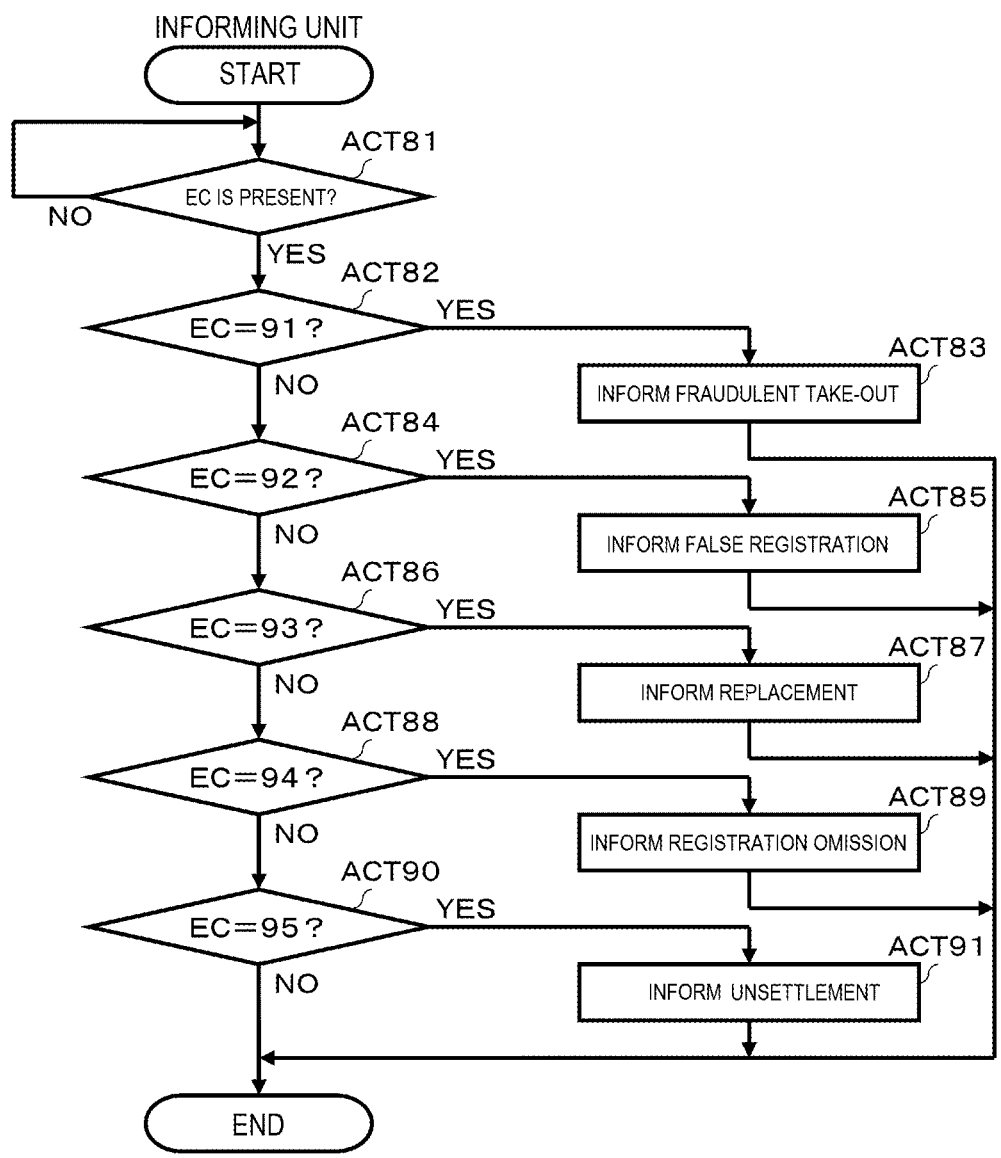
FIG. 12 is a flowchart for explaining a function of an informing unit.

FIG. 12 is a flowchart for explaining the function of the informing unit 224. In ACT 81, the processor 81 waits for the error code EC to be described in the time-series buffer 822. If the error code EC is described in the time-series buffer 822, the processor 81 determines NO in ACT 81 and proceeds to ACT 82. In ACT 82, the processor 81 confirms whether the error code EC is "91."

If the error code EC is "91," the processor 81 determines YES in ACT 82 and proceeds to ACT 83. In ACT 83, the processor 81 informs a fraudulent act "fraudulent take-out." That is, the processor 81 searches through the message table 821 and acquires message data in which the error code EC is "91." The processor 81 acquires a register number of the time-series buffer 822 in which "91" is described as the error code EC. The processor 81 outputs an informing command added with the message data and the register number from the communication interface 86 to the display control device 13.

The display control device 13 displays a text of the message data on the monitoring image SC of the attendant terminal 14 identified by the register number included in the informing command. As a result, a text for informing the fraudulent act such as "fraudulent take-out was performed in a register with a register No. X" is displayed on the monitoring image SC. Therefore, the attendant can direct, to the fraudulent act "fraudulent take-out," attention of a customer using the self-service POS terminal 11 in which the register No. X is set.

If the error code EC is not "91," the processor 81 determines NO in ACT 82 and proceeds to ACT 84. In ACT 84, the processor 81 confirms whether the error code EC is "92."

If the error code EC is "92," the processor 81 determines YES in ACT 84 and proceeds to ACT 85. In ACT 85, the processor 81 informs a fraudulent act "false registration." That is, the processor 81 searches through the message table 821 and acquires message data in which the error code EC is "92." The processor 81 acquires a registration number of the time-series buffer 822 in which "92" is described as the error code EC. The processor 81 outputs an informing command added with the message data and the register number from the communication interface 86 to the display control device 13.

The display control device 13 displays a text of the message data on the monitoring image SC of the attendant terminal 14 identified by the registration number included in the informing command. As a result, a text for informing the fraudulent act such as "false registration was performed in the register with the register No. X" is displayed on the monitoring image SC. Therefore, the attendant can direct, to the fraudulent act "false registration," attention of the customer using the self-service POS terminal 11 in which the register No. X is set.

If the error code EC is not "92," the processor 81 determines NO in ACT 84 and proceeds to ACT 86. In ACT 86, the processor 81 confirms whether the error code EC is "93."

If the error code EC is "93," the processor 81 determines YES in ACT 86 and proceeds to ACT 87. In ACT 87, the processor 81 informs a fraudulent act "replacement." That is, the processor 81 searches through the message table 821 and acquires message data in which the error code EC is "93." The processor 81 acquires a register number of the time-series buffer 822 in which "93" is described as the error code EC. The processor 81 outputs an informing command added with the message data and the register number from the communication interface 86 to the display control device 13.

The display control device 13 displays a text of the message data on the monitoring image SC of the attendant terminal 14 identified by the register number included in the informing command. As a result, a text for informing the fraudulent act such as "a commodity was replaced in the register with the register No. X" is displayed on the monitoring image SC. Therefore, the attendant can direct, to the fraudulent act "replacement," attention of the customer using the self-service POS terminal 11 in which the register No. X is set.

If the error code EC is not "93," the processor 81 determines NO in ACT 86 and proceeds to ACT 88. In ACT 88, the processor 81 confirms whether the error code EC is "94."

If the error code EC is "94," the processor 81 determines YES in ACT 88 and proceeds to ACT 89. In ACT 89, the processor 81 informs the fraudulent act "registration omission." That is, the processor 81 searches through the message table 821 and acquires message data in which the error code EC is "94." The processor 81 acquires a register number of the time-series buffer 822 in which "94" is described as the error code EC. The processor 81 outputs an informing command added with the message data and the register number from the communication interface 86 to the display control device 13.

The display control device 13 displays a text of the message data on the monitoring image SC of the attendant terminal 14 identified by the register number included in the informing command. As a result, a text for informing the fraudulent act such as "registration omission occurred in the register with the register No. X" is displayed on the monitoring image SC. Therefore, the attendant can direct, to the fraudulent act "registration omission," attention of the customer using the self-service POS terminal 11 in which the register No. X is set.

If the error code EC is not "94," the processor 81 determines NO in ACT 88 and proceeds to ACT 90. In ACT 90, the processor 81 confirms whether the error code EC is "95."

If the error code EC is "95," the processor 81 determines YES in ACT 90 and proceeds to ACT 91. In ACT 91, the processor 81 informs a fraudulent act "unsettled." That is, the processor 81 searches through the message table 821 and acquires message data in which the error code EC is "95." The processor 81 acquires a register number of the time-series buffer 822 in which "95" is described as the error code EC. The processor 81 outputs an informing command added with the message data and the register number from the communication interface 86 to the display control device 13.

The display control device 13 displays a text of the message data on the monitoring image SC of the attendant terminal 14 identified by the register number included in the informing command. As a result, a text for informing the fraudulent act such as "the register with the register No. X did not perform settlement yet" is displayed on the monitoring image SC. Therefore, the attendant can direct, to the fraudulent act "unsettled," attention of the customer using the self-service POS terminal 11 in which the register No. X is set.

As explained above in detail, the fraudulent act recognition device 22 functions as the action recognizing unit 221 and recognizes, based on imaging data of the camera 21, an action of a customer performing commodity registration operation in the self-service POS terminal 11. The recognition of the action of the customer is based on the positions of the components of the self-service POS terminal 11 and the position of the hand of the customer facing the self-service POS terminal 11. The fraudulent act recognition device 22 functions as the operation recognizing unit 222 and recognizes, based on data of the monitoring image SC output from the display control device 13 to the attendant terminal 14, the commodity registration operation in the self-service POS terminal 11 by the customer. The fraudulent act recognition device 22 functions as the fraud detecting unit 223 and detects, based on a recognition result by the action recognizing unit 221 and a recognition result by the operation recognizing unit 222, a fraudulent act of the customer from an action of the customer to a commodity for which the commodity registration operation is recognized. That is, the fraudulent act recognition device 22 detects the fraudulent act of the customer from a movement of the hand of the customer holding the commodity recognized by the action recognizing unit 221.

For example, if the taking-out action is recognized without the declaration operation of the use start, the fraudulent act recognition device 22 detects the fraudulent act "fraudulent take-out." If the bagging action of the commodity is recognized without the commodity registration operation, the fraudulent act recognition device 22 detects the fraudulent act "false registration." If the replacing action is recognized after the commodity registration operation, the fraudulent act recognition device 22 detects the fraudulent act "replacement." If the taking-out action is recognized after the settlement start operation or the settlement end operation, the fraudulent act recognition device 22 detects the fraudulent act "registration omission." If the store leaving action is recognized without the settlement end operation, the fraudulent act recognition device 22 detects the fraudulent act "unsettled."

The fraudulent act recognition device 22 functions as the informing unit 224 and includes the function of informing a fraudulent act of a customer to an attendant using the attendant terminal 14. Therefore, the attendant confirming the fraudulent act of the customer can quickly call attention of the corresponding customer. As a result, the fraudulent act of the customer to the self-service POS terminal 11 is suppressed.

In this way, according to this embodiment, an effect of suppressing a fraudulent act of replacing a registered commodity with another commodity is achieved. Therefore, irrespective of presence or absence of a weight meter, it is possible to suppress a fraudulent act of replacing a registered commodity with another commodity having the same weight.

The embodiment of the technique for suppressing a fraudulent act of a customer to the self-service POS terminal 11 is explained above. However, such an embodiment is not limited to this.

In the embodiment, as an example, one camera 21 is disposed for one self-service POS terminal 11. The camera 21 may not always be disposed for each of the self-service POS terminals 11. For example, the number of the cameras 21 may be reduced if customers operating adjacent two self-service POS terminals 11 can be photographed by one camera 21. However, in that case, in ACT 2 in FIG. 7, a register number of the self-service POS terminal 11 closest to the position of a person projected in a video is acquired. For example, a plurality of cameras 21 may be disposed for one self-service POS terminal 11. Consequently, it is possible to reduce a dead angle of the self-service POS terminal 11 and accurately detect a fraudulent act of a customer.

In the embodiment, as an example, the processor 81 recognizes the replacing action of the customer from the movement of the hand obtained by the skeleton estimation. For example, the processor 81 may recognize the replacing action from the posture of the customer. In this case, the replacing action is, for example, an action of lowering the posture of the customer holding a purchased commodity for which registration is finished.

In the embodiment, as an example, the informing unit 224 informs the attendant via the attendant terminal 14. An informing destination is not limited to the attendant terminal 14. For example, the self-service POS terminal 11 in which a fraudulent act is performed may be set as the informing destination. In that case, for example, the light emitting unit 65 emits light in a predetermined color to let a store clerk know that the fraudulent act is performed. Alternatively, a warning message may be displayed on the touch panel 41 to let a customer know that the fraudulent act is detected. A warning of the fraudulent act may be emitted by display or sound through wireless communication with a communication terminal carried by the store clerk.

In the embodiment, the attendant terminal 14 may include the function of the display control device 13. In this case, the operation recognizing unit 222 acquires data of the monitoring image SC from the attendant terminal 14 and recognizes operation of a customer on the self-service POS terminal 11. Alternatively, the operation recognizing unit 222 may capture data signals output from the self-service POS terminals 11, for example, from the communication network 15 via a router and recognize the operation of the customer on the self-service POS terminal 11 based on the data signals.

In the embodiment, the fraudulent act recognition device 22 may include a recording unit that records imaging data captured from the cameras 21. Consequently, if a fraudulent act of a customer is detected, it is possible to reproduce the imaging data captured in the recording unit and verify the fraudulent act.

Besides, several embodiments are explained above. However, the embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A fraudulent act recognition device configured to be operatively coupled to a camera that monitors operation of a settlement terminal by a purchaser, the fraudulent act recognition device comprising a controller configured to:
   recognize a commodity registration operation of the settlement terminal initiated by the purchaser;
   review imaging data provided by the camera to recognize an action of the purchaser who performs the commodity registration operation based on a position of a component of the settlement terminal and a position of a hand of the purchaser while the purchaser faces the settlement terminal;
   determine that a movement of the hand of the purchaser holding a commodity for which the commodity registration operation is recognized is a movement associated with replacing the commodity in response to a determination, based on the imaging data, that the movement of the hand includes at least one of (a) movement of the hand toward a floor or (b) movement of the hand toward an area behind the purchaser;
   determine that the action of the purchaser is indicative of the fraudulent act in response to a determination that the movement of the hand of the purchaser is the movement associated with replacing the commodity; and
   provide a notification in response to a determination that the action of the purchaser is indicative of the fraudulent act.

2. The fraudulent act recognition device of claim 1, wherein the commodity registration operation includes the purchaser scanning a barcode of a commodity using a scanner of the settlement terminal.

3. The fraudulent act recognition device of claim 1, wherein the commodity registration operation includes the purchaser operating a user interface of the settlement terminal to provide a selection of a commodity.

4. The fraudulent act recognition device of claim 1, wherein the controller is configured to recognize the commodity registration operation by reviewing data provided by the settlement terminal, the data relating to a current state of the settlement terminal.

5. The fraudulent act recognition device of claim 1, wherein the controller is configured to provide the notification by commanding a display of attendant terminal to display a message.

6. The fraudulent act recognition device of claim 1, wherein the controller is configured to determine that the movement of the hand of the purchaser is the movement associated with replacing the commodity in response to a determination, based on the imaging data, that the movement of the hand includes the movement of the hand toward the floor.

7. The fraudulent act recognition device of claim 1, wherein the controller is configured to determine that the movement of the hand of the purchaser is the movement associated with replacing the commodity in response to a determination, based on the imaging data, that the movement of the hand includes the movement of the hand toward the area behind the purchaser.

8. A checkout system comprising:
   a settlement terminal configured to be operated by a purchaser to register a commodity for purchase;
   a camera positioned to generate imaging data representing operation of the settlement terminal by the purchaser; and
   a fraudulent act recognition device operatively coupled to the settlement terminal and the camera, the fraudulent act recognition device comprising a controller configured to:
      receive data from the settlement terminal, the data indicating a current state of the settlement terminal;
      review the imaging data provided by the camera to recognize an action of the purchaser, the action including a movement of a hand of the purchaser holding the commodity;
      determine that the action of the purchaser is indicative of a fraudulent act in response to a determination that both (a) the settlement terminal has recognized a commodity registration operation for the commodity and (b) the movement of the hand of the purchaser is a movement associated with replacing the commodity including at least one of (i) movement of the hand toward a floor or (ii) movement of the hand toward an area behind the purchaser; and
      provide a notification in response to a determination that the action of the purchaser is indicative of the fraudulent act.

9. The checkout system of claim 8, wherein the controller is configured to determine that the action of the purchaser is indicative of the fraudulent act in response to a determination that both (a) the settlement terminal has recognized the commodity registration operation for the commodity and (b) the movement of the hand of the purchaser includes the movement of the hand toward the floor.

10. The checkout system of claim 8, wherein the controller is configured to determine that the action of the purchaser is indicative of the fraudulent act in response to a determination that both (a) the settlement terminal has recognized the commodity registration operation for the commodity and (b) the movement of the hand of the purchaser includes the movement of the hand toward the area behind the purchaser.

11. A fraudulent act recognition method comprising:
recognizing a commodity registration operation of a settlement terminal initiated by a purchaser;
reviewing imaging data provided by a camera to recognize an action of the purchaser who performs the commodity registration operation for a commodity, the camera being positioned to monitor operation of the settlement terminal by the purchaser, and the action including a movement of a purchaser holding the commodity;
determining that the action of the purchaser is indicative of a fraudulent act in response to a determination that the movement of the purchaser is a movement associated with replacing the commodity including at least one of (a) movement by the purchaser of the commodity toward a floor or (b) movement by the purchaser of the commodity toward an area behind the purchaser; and
providing a notification to an attendant in response to a determination that the action of the purchaser is indicative of the fraudulent act.

12. The fraudulent act recognition method of claim 11, wherein:
recognizing the commodity registration operation includes receiving data from the settlement terminal, the data indicating a status of the settlement terminal; and
determining whether the action of the purchaser is indicative of the fraudulent act includes determining whether the action of the purchaser is indicative of the fraudulent act based on the status of the settlement terminal and the imaging data.

13. The fraudulent act recognition method of claim 11, wherein the movement associated with replacing the commodity is the movement by the purchaser of the commodity toward the floor.

14. The fraudulent act recognition method of claim 11, wherein the movement associated with replacing the commodity is the movement by the purchaser of the commodity toward the area behind the purchaser.

* * * * *